Nov. 1, 1932.  H. T. THOMAS ET AL  1,885,156
TRANSMISSION MECHANISM
Filed April 3, 1931   3 Sheets-Sheet 1

INVENTORS
Horace T. Thomas,
Albert B. Hays,
John Bethune.
BY
ATTORNEYS.

Nov. 1, 1932. H. T. THOMAS ET AL 1,885,156
TRANSMISSION MECHANISM
Filed April 3, 1931  3 Sheets-Sheet 3

INVENTORS.
Horace T. Thomas,
Albert B. Hays,
John Bethune.
BY
ATTORNEYS.

Patented Nov. 1, 1932

1,885,156

UNITED STATES PATENT OFFICE.

HORACE T. THOMAS AND JOHN BETHUNE, OF LANSING, MICHIGAN, AND ALBERT B. HAYS, OF ROCHESTER, NEW YORK, ASSIGNORS TO REO MOTOR CAR COMPANY, OF LANSING, MICHIGAN, A CORPORATION OF MICHIGAN

TRANSMISSION MECHANISM

Application filed April 3, 1931. Serial No. 527,520.

This invention relates to transmission mechanism and particularly that type thereof suitable for use in connection with motor vehicles, the principal object being the provision of a device of this type that will be simple in construction, efficient in operation and economical to manufacture.

Another object is to provide a device of the type described having a plurality of gear ratios, and means dependent upon the relative speed of the motor vehicle for automatically rendering either one of the two gear ratios effective during different rates of speed of the vehicle.

Another object is to provide a transmission mechanism wherein, when the driven shaft falls below a predetermined rate of rotation, a positive reduction in the relative rate of rotation between the driving and the driven shafts will automatically be established.

Another object is to provide a device of the type described in which a gear reduction mechanism is provided between the driving and the driven shafts and which is automatically rendered ineffective beyond a predetermined rate of rotation of the driven shaft, but which is positively rendered effective at low rates of rotation of the driven shaft and accompanying transmittal of a material amount of torque therethrough.

Another object is to provide a device of the type described including a rotatable supporting member, a gear reduction mechanism interposed between the driving and driven elements and carried at least in part by the supporting member, together with automatic means permitting rotation of the supporting member in one direction when the driving and driven shafts are connected together for equal rotation, and automatically preventing rotation of the supporting member in the opposite direction to render the gear mechanism positively effective to establish a difference in the rates of rotation of the driving and driven shafts at certain periods of operation.

Another object is to provide a device of the type described including concentric spur and internal gears secured to the driving and driven shafts respectively, with an eccentric combination internal-and-external gear member connecting the two, rotatably mounted means concentric with the shatfs for supporting the combination gear, and automatic means limiting rotation of the rotatably mounted means to one direction only whereby to render the gear reducing characteristics of the gear mechanism positively effective.

Another object is to provide a device of the type described including a gear reduction mechanism interposed between the driving and driven shafts, and centrifugally actuated means for automatically locking said gear reduction mechanism against effective operation beyond an approximately predetermined speed of rotation of one of the shafts.

Another object is to provide a transmission mechanism automatically controlled by the speed of the driven shaft.

Another object is to provide a device of the type described including a gear reduction mechanism interposed between the driving and driven shafts, together with centrifugally operable means rotatable with the driven shaft for controlling the effective operation of the gear reducing mechanism.

Another object is to provide an automatic transmission of the centrifugally controlled type operable equally throughout its various speed ranges regardless of the direction of rotation of the driven shaft.

Another object is to provide a novel form of reverse mechanism for transmissions.

Another object is to provide a transmission mechanism including a pair of independent gear units connected in series between the driving and the driven shafts, one of the units being adapted for operation independently of or simultaneously with the other thereof.

The above being among the objects of the present invention the same consists in certain features of construction and combinations of parts to be hereinafter described with reference to the accompanying drawings, and then claimed, having the above and other objects in view.

In the accompanying drawings which illustrate one suitable embodiment of the present invention, and in which like numerals refer to like parts throughout the several different views:—

Fig. 5 is a vertical sectional view taken transversely through my transmission on the line 5—5 of Fig. 1, and illustrating certain features of the reversing mechanism.

Figure 1:
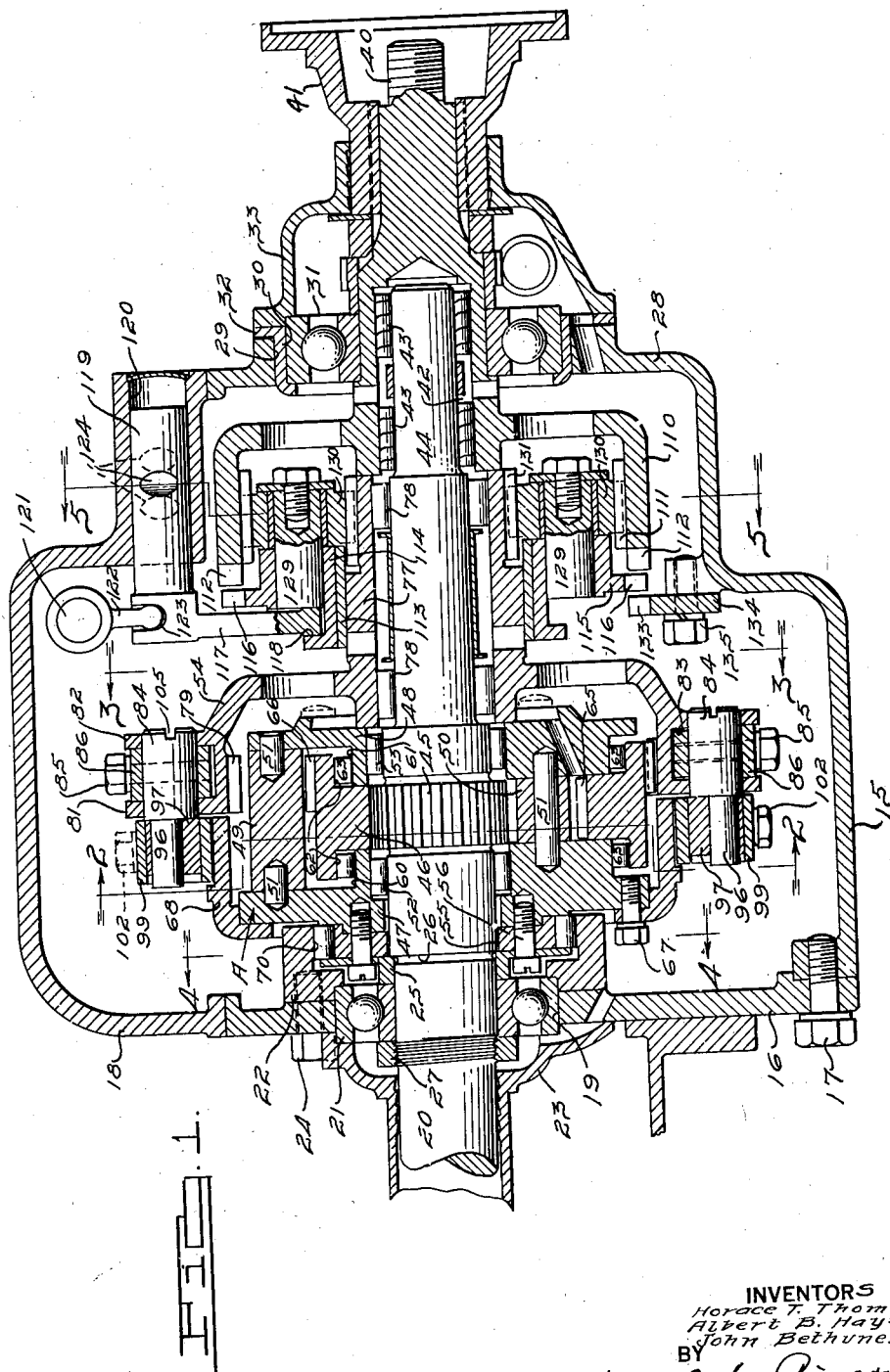
Figure 1 is a vertical sectional view taken axially through my improved transmission.

The present invention deals with that type of transmission mechanisms designed particularly for use in connection with motor vehicles, and further to that type of transmission mechanisms in which the effective ratio of reduction in the drive between the driving and driven shafts will be automatically controlled whereby to render the transmission automatic in effecting such changes in ratio as conditions of driving may warrant. An important feature of the present invention is that the changes of ratio between the driving and driven elements in the transmission are controlled by the rate of rotation of the driven element, which is adapted to be connected, either directly or indirectly, with the road wheels, except as the effects of such rates of rotation on the transmission may be modified, as hereinafter explained, by the amount of torque being transmitted through the transmission. In constructions of a similar nature heretofore proposed, such change in ratio is effected by the rate of rotation of the driving element. The value of this feature of the present invention is that the speed of the vehicle being driven and the torque of the engine thereof, and not the speed of the engine, are the controlling factors.

The invention contemplates the provision of a gear reduction mechanism interposed between the driving and driven shafts, the effective operation of which mechanism is in turn controlled by centrifugally actuated means carried by the driven element. For the purpose of simplicity in design and minimizing the forces required for the proper operation of such gear reduction mechanism, thereby permitting the use of lighter parts and consequent reduction in weight of the entire mechanism, I utilize the gear reduction mechanism of the type including concentric internal and external gears operatively connected together through the medium of an eccentric combination internal-external gear. I find that the use of this type of gear reduction mechanism includes, as one of its characteristics, a substantial locking effect tending to lock the gears engaged therewith together for equal rotation. One result of this locking effect is to reduce the tendency of bodily rotation of the combination gear about the axis of rotation of the cooperating gears, and this permits a relatively small, simple and efficient means for positively controlling the direction of rotation of the supporting means for the combination gear, and which locking means may be effectively provided in the nature of an overrunning clutch.

The exact nature of the invention will be more clearly brought out in the following detailed description of the mechanism.

In the accompanying drawings my improved transmission is shown as being enclosed in a housing comprising a main portion 15 having a removable front wall 16 secured thereto as by screws 17, and a suitable cover 18 which may be secured in place by any suitable means (not shown). The forward wall 16 of the housing is provided with an opening 19 through which the rearwardly extending drive shaft 20 projects. It will be understood that when my transmission is employed for use in connection with an automobile the shaft 20 will be connected to the engine (not shown) through any conventional or other form of clutch mechanism (not shown).

The shaft 20 may be supported by the forward wall 16 by means of a suitable bearing member, such as the ball bearing assembly 21, illustrated in Fig. 1, confined peripherally in the opening 19 and secured against axial movement therein by means of the inner annular member 22 and outer flange member 23 secured in place to the wall 16 by means of screws such as 24 (see Fig. 1). The shaft 20 is maintained against axial movement within the casing by clamping the inner race of the bearing 21 between the spacer member 25, surrounding the shaft 20 and abutting against the shoulder 26 formed thereon, and the nut 27 threaded onto the shaft 20.

The rear wall 28 of the casing is provided with an aperture 29 which receives the sleeve member 30 which in turn carries the bearing assembly 31. The sleeve member 30 is held against axial movement relative to the casing by clamping its radial flange 32 between the rear wall 28 of the casing and the speedometer drive housing 33.

The driven shaft 40, which may carry a flange or spider member 41 at its rear end, is enlarged at its forward end where it is closely received within the inner race of the bearing 31. The enlarged forward end of the driven shaft 40 is provided with a concentric bore 42 in which is received longitudinally extending bearing members 43 which rotatably support the reduced rear end 44 of the drive shaft 20 therein.

Spaced rearwardly of the front wall 16 of the housing the drive shaft 20 is provided with a spur gear 45 fixed thereto in concentric relation therewith. Substantially enclosing the gear 45 is what may be termed a casing, generally designated at A, which rotatably supports a combination internal-external gear 46. This casing A comprises the forward end portion 47, the rearward portion 48 and the outer and inner crescent shaped spacer members 49 and 50 respectively. These casing members are maintained against relative rotation by means of dowels such as 51 or other suitable means. The casing end members 47 and 48 are rotatably supported upon the drive shaft 20 by means of bearings 52 and 53.

The casing A is maintained against axial movement relative to the drive shaft 20 by being confined between the forward face of the hub portion of the spider member 54, to be more fully described later, and by engagement of the ring member 55 secured to its forward face by means of screws 56, with the rear edge of the spacer member 25.

The rear side of the member 47 is provided with a radially outwardly facing bearing track 60 disposed in eccentric relationship with respect to the axis of the shaft 20. The forward face of the member 48 is provided with a like track 61 concentric with the track 60. Both forward and rear faces of the combination gear 46 are provided with radially inwardly facing tracks 62 which overhang the tracks 60 and 61, and between the tracks 62 and the tracks 60 and 61 respectively, are provided a plurality of roller bearings 63 which thus serve to rotatably support the combination gear 46 on the eccentric tracks 60 and 61. The tracks 62 being formed concentrically with respect to the combination gear 46, it will be apparent that the gear 46 is supported for rotatable movement about an axis eccentric to the axis of the drive shaft 20.

Figure 2:
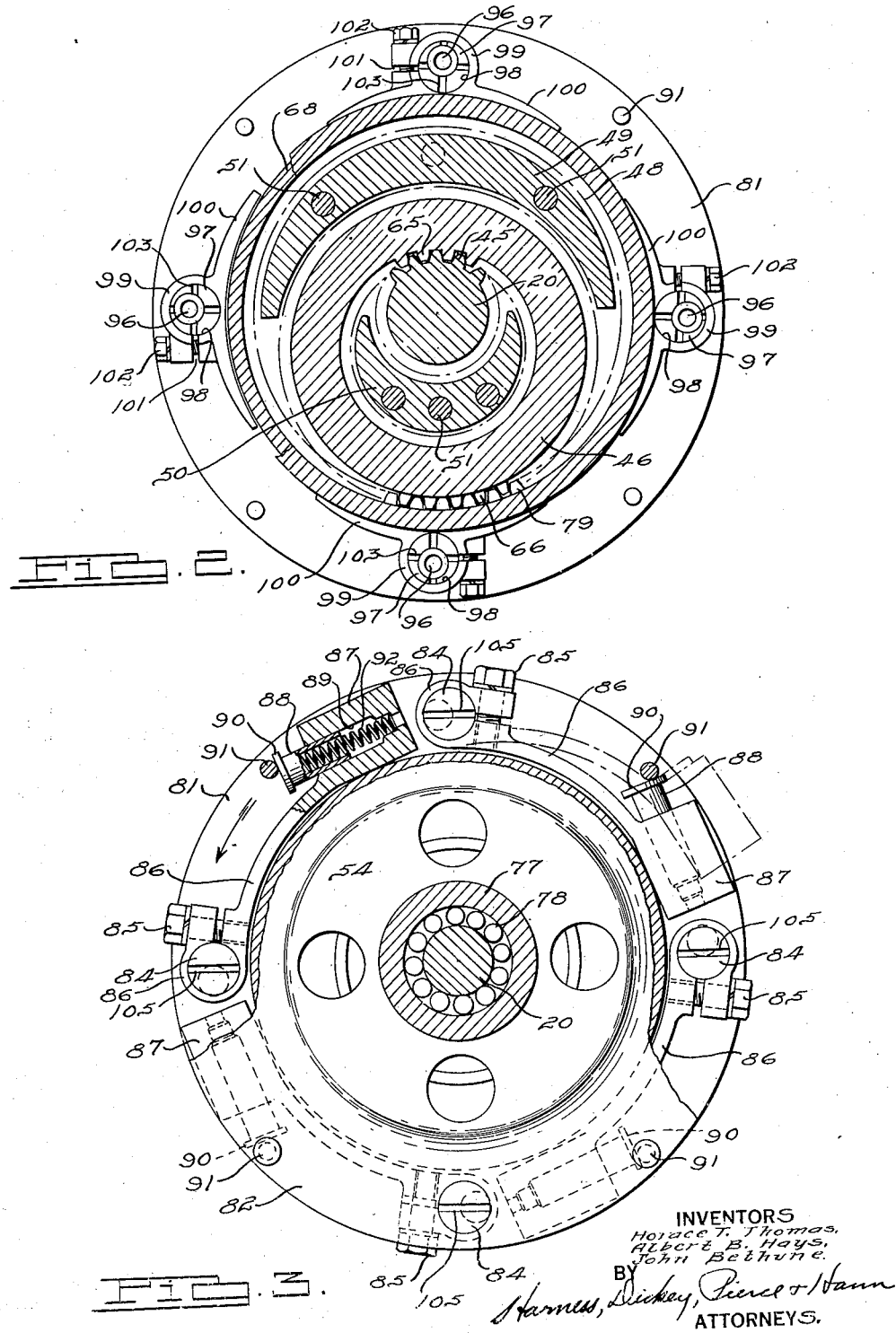
Fig. 2 is a vertical sectional view taken transversely through the transmission as on the line 2—2 of Fig. 1.

The inner surface of the combination gear 46 is provided with gear teeth 65 arranged concentrically with respect to the axis of the gear 46 and of such pitch diameter as to engage the teeth of the spur gear 45 over a limited portion of the circumference thereof as best illustrated in Fig. 2. Fig. 2 also illustrates the crescent shaped formation of the spacer members 49 and 50 between the members 47 and 48 which permits rotational movement of the combination gear 46 between the latter members. Approximately the rear half of the combination gear 46 is externally provided with gear teeth 66 concentrically arranged thereon and consequently eccentrically arranged with respect to the axis of the shaft 20. Secured to the forward face of the member 47 by means of screws such as 67 is the rearwardly projecting brake drum 68. This brake drum 68 is arranged concentrically of the shaft 20.

Figure 4:
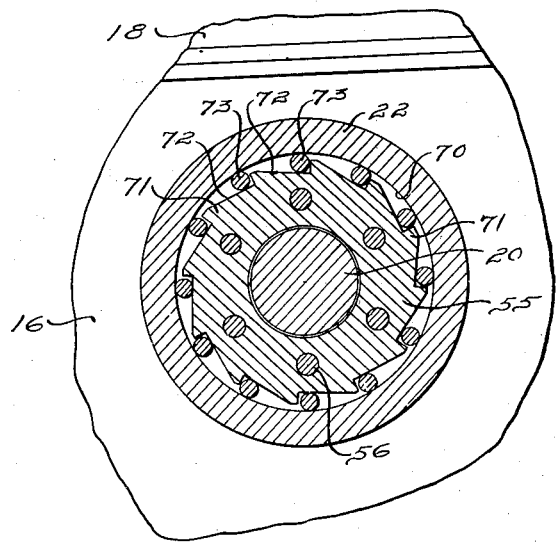
Fig. 4 is a vertical sectional view taken transversely through my transmission as on the line 4—4 of Fig. 1, and illustrating the automatic clutch for limiting rotation of the gear casing to one direction only.

The ring member 22 which is fixed to the rear face of the forward wall 16 of the transmission housing by the screws 24 is provided at its rear end with a radially inwardly facing annular track 70 disposed in concentric relation with respect to the axis of the shaft 20. As best illustrated in Fig. 4 the periphery of the ring member 55 disposed within the track 70 is provided with a plurality of ratchet-like tooth portions 71, and disposed between the inclined face 72 of each thereof and the track 70 is a roller 73. The rollers 73 are of such diameter that when they are located at that end of their corresponding surface 72 which is closest to the axis of the shaft 20, a slight clearance is present between them and the track 70, but when moved toward the tip of their corresponding tooth portion 71 they become engaged between the track 70 and the corresponding surface 72. This construction will be readily recognized as a conventional form of ratchet or overrunning clutch, which permits rotation of the ring member 55 relative to the ring member 22 in one direction, but prevents it from relative rotation with respect to the ring member 22 in the opposite direction of rotation. It will be obvious in the following specification that other types of ratchet or overrunning clutches may be employed in the place of the specific type shown without materially affecting the invention involved herein.

The ring member 55 being secured against relative rotation to the casing A, it will be apparent that this overrunning clutch will permit rotation of the casing in a clockwise direction as viewed in Fig. 4, but will maintain it against counter-clockwise rotation. The significance of this fact will be brought out later in the description.

Rearwardly of the member 48 is a sleeve-like member 77 rotatably supported in concentric relation with respect to and on the shaft 20 by the bearing members 78. The spider 54 is formed on the forward end of this sleeve-like member 77 and carries adjacent its outer end and projecting forwardly therefrom the internal gear 79 which is arranged concentrically with respect to the drive shaft 20 and is of such a diameter as to properly mesh with the external teeth 66 on the combination gear 46 as best indicated in Fig. 2.

It will thus be obvious that the combination gear 46 forms a driving connection between the gear 45 and the gear 79 effecting a reduction in the ratio of rotation from the gear 45 to the gear 79. Those familiar with the gearing art will readily recognize this type of gearing as one which involves a relatively great friction lock tending to lock the gears 45 and 79 together of equal rotation, and consequently tending to prevent bodily movement of the combination gear 46 about the axis of the shaft 20 in the reverse direction. Consequently in this type of reduction gearing it is only necessary to exert a relatively small force to hold the housing A, which rotatably supports the gear 46, against rotation in a direction of rotation opposite to that of the gear 45, and consequently the clutch illustrated in Fig. 4 which serves to maintain this casing against rotation in one direction, is only required to exert a relatively small force to prevent such rotation of the casing. For this reason this overrunning clutch may be made relatively small and compact in nature.

Figure 3:
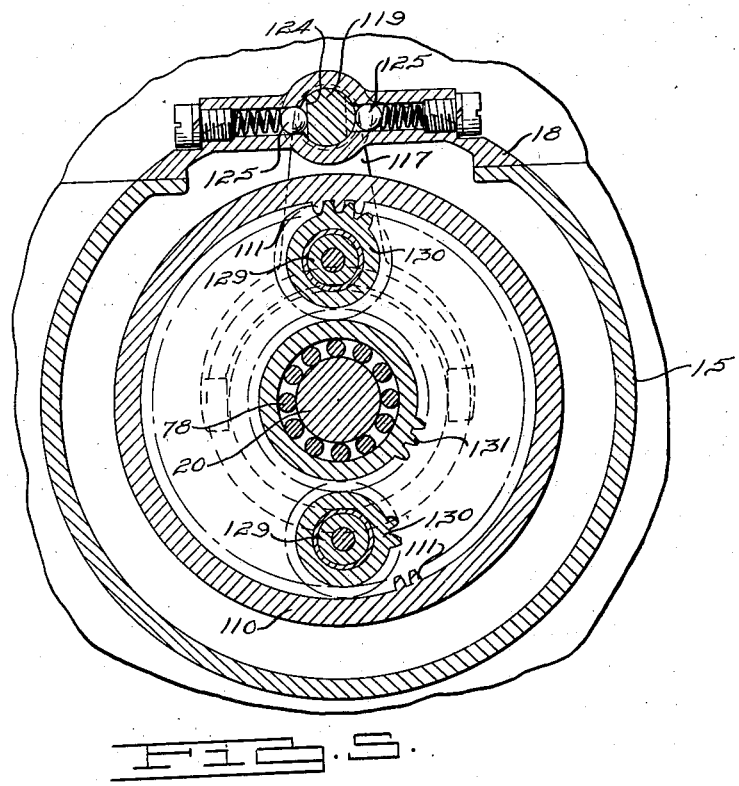
Fig. 3 is a vertical sectional view taken transversely through my transmission as on the line 3—3 of Fig. 1.

The periphery of the spider member 54 is provided with a pair of axially spaced radially extending flanges 81 and 82 forming an outwardly opening channel 83 between them. As best indicated in Fig. 3 rotatably disposed and supported between the flanges 81 and 82 in axially parallel relationship with respect to the shaft 20, and equally angularly spaced around the periphery of the spider member 54, are a plurality of pins 84, four being shown in the specific construction illustrated. As best illustrated in Fig. 3, to each of the pins 84 within the channel 83, is clamped, by means of cooperating screws 85, one end of a curved arm 86 which extends away from the corresponding pin 84 in a direction opposite to the direction of rotation of the spider 54. The opposite end of each arm 86 which extends into adjacent relationship with respect to the next adjacent pin 84 opposite to the direction of rotation, has formed thereon a mass or weight 87 adapted to be effected by the centrifugal force to which it is subjected during rotation with the spider member 54.

Means are provided for urging the ends 87 radially inwardly of the spider 54 and consequently urging the pins 84 in a clockwise direction of rotation as viewed in Fig. 3. These means which are the same for each arm, and consequently one only of which will be described, comprises a tubular member 88 axially slidably received in a bore 89 formed in the weight 87 in a direction slightly inclined to normal with respect to a line radially disposed relative to the shaft 20 and passing through the center of the weight. It will also be understood that the axes of the bores 89 are disposed in a plane perpendicular to the shaft 20. The outer end of the member 88 is preferably provided with an enlarged head 90 adapted to engage a cooperating pin 91 disposed between the flanges 81 and 82 and acting as a stop surface therefor. A coil spring 92 is held under compression in the bore 89 between the bottom end of such bore and the outer blind end of the tubular member 88. The tubular members 88 in thus being pressed outwardly of the corresponding bores 89 react against the corresponding stop pins 91 to urge the weight 87 inwardly toward the axis of the shaft 20. The enlarged heads 90 of the members 88, having sliding engagement with their corresponding stop pins 91, readily permit radially outward movement of the corresponding weights 87 under the influence of sufficient centrifugal force to overcome the inwardly urging force of the corresponding springs 92.

Each of the pins 84 is provided with a forwardly extending smaller pin portion 96 eccentrically disposed with respect to the axis thereof. These pins 96 extend in overlapping relationship with respect to the periphery of the brake drum 68 secured to the housing A. Rotatably mounted on each of the pins 96 is an eccentric bushing 97 which is rotatably received in the bore 98 of the lugs 99 formed centrally on the corresponding crescent shaped brake shoe 100. The lugs 99 are split as at 101 and a cooperating screw 102 is provided in its outer face with diametrically sponding eccentric bushing 97 so as to lock the bushing 97 against relative rotation therein. Each eccentric bushing 97 is provided in its outer face with diametrically disposed slots 103 permitting engagement thereof with a screw driver or other tool so that it may be rotated upon loosening the corresponding screw 102, to adjust the normal clearance between the operative face of the corresponding brake shoe 100 and the periphery of the brake drum 68.

With the construction thus described it will be apparent that when the mechanism is at rest or, in other words, when it is not rotating, the springs 92 will urge the weight 87 inwardly against the bottom of the channel 83, thus moving the pins 84 to their extreme position in a clockwise direction as viewed in Fig. 3, and consequently moving the sub-pins 96 outwardly away from the axis of the shaft 20. This movement of the pins 96 carries the corresponding brake shoe 100 radially outwardly with respect to the axis of the shaft 20, and consequently out of contact with the surface of the brake drum 68. As will also be obvious, when the device is rotated at a sufficient rate of speed the centrifugal force acting on the weights 87 will move them outwardly against the force of the corresponding springs 92. This movement of the weights 87 acting through the arms 86 will rotate the pins 84 and 96 in a counter clockwise direction as viewed in Fig. 3, and thus move the brake shoes 100 inwardly into contacting relationship with respect to the brake drums 68 upon which they will exert a braking effort. The speed at which such movement occurs may, of course, be controlled by varying the stiffness and amount of compression of the springs 92, but I prefer that the force of such springs be sufficient to maintain the brake shoes 100 out of sufficiently firm contact with the brake drum 68 to lock them against movement thereto at vehicle speed under, for instance, 10 miles per hour. However, it will be apparent that the particular speed at which this firm or locking engagement takes place may be varied in accordance with the desires or dictates of the particular designer.

It might be here noted that an adjustment of the brake shoes 100 supplementary to the adjustment of the eccentric bushings 97 may be supplied through rotation of the pins 84 in the ends of the arm 86. To facilitate such further adjustment the ends of the pins 84 are preferably provided with screw driver slots 105.

The drive from the spider 54 to the driven shaft 40 will now be explained. A forwardly opening drum shaped member 110 is fixed to the forward enlarged end of the driven shaft 40. The inner periphery of the member 110 is provided with teeth forming an internal gear 111 concentric with respect to the axes of the shafts 20 and 40. The forwardly disposed free edge of the member 110 is provided with axially extending teeth 112. Rotatably supported by the bearing 113 on the exterior surface of the sleeve member 77 is a member 114 having an outer radially disposed flange portion 115, the periphery of which is toothed as at 116 (shown in Fig. 1) in a position to engage and to interlock with the teeth 112 when the member 114 is shifted rearwardly from the position shown in Fig. 1.

Shifting of the member 114 axially on the sleeve member 77 is accomplished through the medium of an arm member 117 whose yoked free end is slidably received in an annular groove 118 in the member 114, and which arm is carried by a short shaft 119 axially slidably received in the bore 120 formed in the rear portion of the cover 18. The axial position of the shaft 119 and, consequently, the arm 117 may be controlled through a manually rockable shaft 121 having a short arm 122 fixed thereto and engaged in a recess 123 formed in the upper face of the arm 117.

The shaft 119 is preferably provided on opposite sides, with axially spaced notches 124 adapted to be engaged by spring pressed balls 125, indicated in Fig. 5, to resiliently hold the shaft 119 in axially adjusted position in much the same manner that the conventional detents are employed in connection with the shifter rods of conventional automobile transmission mechanisms.

A reverse mechanism for the transmission is worked into this part of the design in the following manner. The member 114 carries a pair of rearwardly extending pins 129 upon each of which is mounted a pinion 130 which lies in mesh with the internal gear 111 formed on the inner periphery of the drum member 110. A spur gear 131 is formed on the periphery of the sleeve member 77 and also meshes with the pinions 130. This forms a planetary gearing system which, when the spider 54 is turned in its normal direction of rotation (which is counter-clockwise as viewed in Fig. 3) tends to turn the drum member 110 and consequently the driven shaft 40, when not restrained from such movement, in the opposite or clockwise direction. However, it will be apparent that when the member 114 is shifted rearwardly by the arm 117 to bring the teeth 116 into engagement with the teeth 112 formed on the ends of the drum member 110, then relative rotation between the member 114 and the drum member 110 is prevented, and such members are locked together for equal rotation. Consequently, in such case the pinions 130 serve to lock the member 77 and consequently the spider 54 to the driven shaft 40 for equal rotation therewith. As will be apparent, this is the normal position of the mechanism for forward driving of the automobile.

When it is desired to reverse the direction of rotation of the driven shaft 40 with respect to the driving shaft 20, then the member 77 is shifted forwardly from the position indicated in Fig. 1. In such case the teeth 116 on the member 77 are brought into locking engagement with teeth 133 formed on the plate-like member 134 fixed to the casing 15 by means of the screws 135. In such case the member 77 is locked against rotation relative to the casing 15 and the drum member 110 is free to rotate relative thereto. Consequently, the gear 131, turning in a counter-clockwise direction as viewed in Fig. 5, will act through the pinions 105 to rotate the drum member 110 in the opposite direction of rotation.

The operation of the construction will now be described in full. Considering the device as being located in an automobile with the driven shaft 40 connected through the flange member 41 and other usual members with the drive wheels, and the drive shaft 20 connected through a clutch to the engine in the conventional manner, it will first be considered that the automobile is stationary and the shifter shaft 119 is in the position indicated in Fig. 1. If the engine is running at idling speed at this point of operation and the clutch between it and the shaft 20 is engaged, then the shaft 20 is rotating directly with the engine and the driven shaft 40 is stationary inasmuch as it is connected with the road wheels which are considered to be stationary at this point of operation.

The shaft 20 in turning in a counter clockwise direction, as viewed in Fig. 3, carries with it the gear 45 in the same direction of rotation. The gear 45 meshing with the combination gear 46 turns the combination gear 46 with it in the same direction, and the combination gear 46 meshing with the gear 79 on the spider 54 turns the spider 54 in the same direction of rotation. The sleeve member 77 which is integrally connected with the spider member 54 consequently turns in a counter clockwise direction of rotation as viewed in Fig. 3 and carries with it the teeth thereon forming the gear 131. The gear 131 in meshing with the pinions 130 of the reverse mechanism cause them to move bodily around the axis of the shaft 20 in a counter clockwise direction as viewed in Fig. 5, since the drum member 110 is, at this point of operation, maintained against rotation with the road wheels and the member 114 is free to revolve on the sleeve member 77. Consequently, at this point of operation, the only resistance to rotation of the shaft 20 is the friction or drag existing between the various cooperating parts connected thereto. This resistance will, of course, be transmitted through the combination gear 46, but any tendency for bodily movement of the latter in a clockwise direction in response to such drag, and sufficient to overcome the self locking characteristics of the gear assembly, will be prevented by the overrunning clutch previously described, and in a manner which will be more clearly apparent hereafter.

If, now, the clutch connecting the shaft 20 to the engine is disengaged momentarily and the shifter shaft 119 is moved rearwardly so as to move the member 114 rearwardly a sufficient distance to engage the teeth 116 with the teeth 112 on the drum member 110 then, as previously described, the sleeve member 77 and consequently, the spider member 54 and internal gear 79, are locked to the drum member 110 and consequently the driven shaft 40 for equal rotation therewith. If, now, the clutch connecting the shaft 20 to the engine is gradually engaged, the rotational movement of the shaft 20 will be transmitted through the gears 45 and 46 to the internal gears 79, tending to rotate it in the same direction of rotation as the shaft 20, and consequently, rotating the driven shaft 40 in the same direction of rotation as the shaft 20. The driving power of the engine is thus transmitted from the shaft 20 to the shaft 40 through the gears 45, 46 and 79, and because of the reduction in the driving ratio existing between the gears 45 and 79 the torque impressed upon the shaft 20 will be multiplied by such ratio and transmitted to the shaft 40, thus impressing upon the road wheels of the vehicle a relatively high torque for starting purposes.

Due to the relatively great force which must be exerted in accelerating the mass of the automobile to get it moving from a stationary position, a relatively great resistance will be offered upon starting to the rotation of the shaft 40, and this resistance will, of course, be transmitted to the gear 46. This resistive force in being transmitted to the gear 46 will tend to bodily rotate the gear 46 about the axis of the shaft 20 which is eccentric to its own axis, and the resultant tendency of bodily rotation of the gear 46 will be in a clockwise direction, as viewed in Fig. 3 or from the rear of the transmission. If such rotating tendency of the gear 46 is not restricted, it will be apparent that the gear 46 would merely rotate about the axis of the shaft 20 and no effective driving force would be transmitted through it. However, it will be apparent that where the gear 46 is to rotate bodily about the axis of the drive shaft 20 it must carry the casing A therewith, and due to the fact that the ratchet member 55 is fixed relative to the member 47, such clockwise movement of the casing A and gear 46 is automatically and positively prevented. Consequently, during this phase of operation, the overrunning clutch including the ratchet member 55 effectively maintains the gear reduction ratio in the drive between the gear 45 and the gear 79, and consequently the torque impressed upon the shaft 20 is multiplied by such ratio in the drive between the gears 46 and 79, and is impressed upon the driven shaft 40.

When the shaft 40 is thus caused to rotate as above described, and the throttle of the engine is advanced so as to increase the speed of the vehicle, the speed of the driven shaft 40 and consequently the spider member 54 will eventually become great enough to exert sufficient centrifugal forces on the weights 87 to overcome the force of the springs 92, and the weights 87 in moving outwardly will cause an inward movement of the brake shoes 100 towards the brake drum 68. As the speed of the driven shaft continues to increase the brake shoes 100 will thus be pressed, gradually at first, and then with increasing force, into contact with the brake drum 68, until sufficient force is exerted to prevent relative rotation between the brake shoes 100 and the drum 68. The first engagement between the brake shoes 100 and the brake drum 68 will set up a drag tending to turn the brake drum 68 with the spider 54, and as soon as this drag becomes great enough to overcome the forces tending to turn the gear 46 in a clockwise direction as viewed from the rear of the transmission, the casing including the members 47 and 48 will begin to rotate in the same direction of rotation as the spider 54, the overrunning clutch including the ratchet 55 freely allowing such rotative movement.

The exact speed of the driven shaft at which the brake shoes become locked against movement to the brake drum will, of course, vary to a certain extent with the amount of torque being delivered by the engine to the wheels. That is, it will be necessary to press the brake shoes 100 against the drum 68 more firmly, to prevent relative rotation therebetween, where a large amount of torque is being transmitted through the mechanism than where a materially less amount of torque is being transmitted therethrough, and the more firm engagement in the case of the larger amount of torque will necessarily require a higher speed of rotation of the driven shaft to obtain it.

As will be apparent, any rotative movement of the casing A, and consequently the gear 46, in the same direction of rotation as the spider member 54 and drive shaft 20, will tend to reduce the driving ratio normally existing between the gears 45 and 79, and consequently will increase the relative rate of rotation of the driven shaft 40 with respect to the drive shaft 20. As the brake shoes 100 are pressed into firmer engagement with the brake drum 68, the difference in the rate of rotation between the brake drum 68 and the drive shaft 20 will be decreased, consequently causing a decrease in the relative driving ratio between the shaft 20 and the spider 54 until a point is reached at which the force acting on the weights 87 will move the brake shoes 100 into such firm contact with the brake drum 68 as to cause it to rotate directly and equally with the spider 54. When this occurs it will be apparent that the gear 46 is no longer effective to reduce the driving ratio existing between the gear 45 and the gear 79, and consequently the spider member 54, and thus the driven shaft 40, will be caused to rotate directly and equally with the drive shaft 20, thus connecting the engine to the drive shaft 40 for equal movement therewith.

From the foregoing it will be apparent that in starting up the automobile from a stationary position, the power in the drive shaft 20 will first be positively multiplied by the driving ratio between the gears 45 and 79 and be transmitted to the driven shaft 40 and consequently the road wheels of the automobile. As the automobile picks up in speed a point will be reached where sufficient force is exerted by the brake shoes 100 and the brake drum 68 to start rotation of the brake drum 68 with the spider 54, and as this tendency is increased with increased speed of the automobile, the driving ratio between the driving and driven shafts will gradually be reduced until they are eventually locked together for equal rotation. Furthermore, it will be apparent that the functioning of this part of the mechanism is entirely automatic and dependent upon the speed of the automobile in which it is located, and the corresponding relative amounts of torque being transmitted from the engine to the wheels.

It will be apparent from the foregoing that the present construction thus provides a device by means of which when the engine clutch is first engaged and the vehicle is in a stationary position, the power from the engine is first applied through a positive gear reduction mechanism to the driven wheels, and as the speed of the vehicle increases the ratio of reduction in the drive between the engine and the propeller shaft is automatically and gradually reduced until at the time the vehicle attains such speed that the propeller shaft is locked for equal rotation with the engine. As previously noted the speed of the vehicle at which the driving and driven elements of the transmission are locked together for equal rotation is a somewhat variable factor, depending upon the relative amount of torque being transmitted through the device, and even the range of speeds at which this occurs may be changed in a number of various ways, such as, for instance, varying the force exerted by the springs 92. Ordinarily, as above noted, I prefer that the normal speed of the vehicle at which such direct drive takes place be in the neighborhood of ten miles per hour.

From the above it must not be understood that because direct driving relation between the driving and driven shafts takes place within a fairly definite range of speeds of the driven shaft when the vehicle is being put in motion, the change from direct drive to a reduced drive will take place in the same range of speeds when the speed of the vehicle is being reduced. As a matter of fact the speed of the vehicle at which this last change takes place will normally be considerably lower than in the case where the speed of the vehicle is being increased. The reason for this is that during those periods of operation in which the speed of the vehicle is being decreased, a relatively small amount of torque is being transmitted between the engine and the wheels. Consequently but little force is required on the brake shoes 100 to lock them against relative movement to the drum 68. More important, however, is the self locking characteristics of the combination gear 46 with the gears 45 and 79, which tends to lock the last mentioned gears together for equal rotation, and which actually has this effect under low torque transmitting periods of operation.

Another feature of the construction described, and which is of particular interest, is that during decelerating periods of the vehicle the self locking features referred to tends to rotate the combination gear 46, and consequently the housing A, with the driven shaft in excess of the speed of the driving shaft 20, the overrunning clutch including the members 22 and 55 readily permitting such movement of the housing A. This, in effect, provides an effect commensurate with the effects of the so-called "free wheeling" devices now widely employed by the motor vehicle industry.

When it is desired to reverse the direction of movement of the vehicle, the shifter shaft 119 is simply moved to bring the teeth 116 on the member 114 into engagement with the teeth 133 of the member 134 fixed on the casing 15. The member 114 is then locked against relative rotation and the drum member is free to rotate relative thereto. In such a case, counter clockwise direction of rotation of the member 77, as viewed from the rear of the transmission, will cause a clockwise direction of rotation of the pinions 130 and they, in turn, will cause a clockwise direction of rotation of the drum 110 and consequently the driven shaft 40, thus causing the driven shaft 40 to be driven in the opposite direction of rotation from the drive shaft 20. All of the automatic characteristics of the transmission heretofore discussed will, of course, be effective in this reverse drive the same as in forward drive, and consequently the transmission offers the same range of driving speeds in reverse as it does in forward driving position, the only difference being that the planetary reversing gears effect a greater difference in the speed ratio existing between the driving and driven shafts when the transmission is in reverse.

It will be obvious that the above principles of construction disclosed in the specific embodiment of my invention shown in the drawings is capable of a relatively wide variation, and it will be understood that such variations may be made without departing from the spirit and substance of the invention involved, the scope of which is commensurate with the appended claims.

I claim:

1. A speed controlling transmission comprising a fixed supporting member, a driving shaft journaled in the member and having a gear non-rotatably mounted thereon, a pair of web members rotatably disposed upon the shaft, one upon each side of the gear, a one way clutch having one element thereof rigidly secured to the supporting member and the other element secured to the adjacent web member, a gear mounted in concentric relation with respect to the shaft upon the other web member, gearing providing a positive driving connection between the latter gear and the gear upon the shaft and means for locking the two web members together.

2. A speed controlling transmission comprising a fixed supporting member, a driving shaft journaled on the member and having a gear non-rotatably mounted thereupon, a pair of web members rotatably disposed upon the shaft one upon each side of the gear, a one way clutch having one element thereof rigidly secured to the supporting member and the other element secured to the adjacent web member, a gear mounted in concentric relation with respect to the shaft on the other web member, gearing providing a positive driving connection between the latter gear and the gear upon the shaft and friction clutch means for interconnecting the web members.

3. A speed controlling transmission comprising a fixed supporting member, a driving shaft journaled in the member and having a gear non-rotatably mounted thereon, a pair of web members rotatably disposed upon the shaft, one upon each side of the gear, a one way clutch having one element thereof rigidly secured to the supporting member and the other element secured to the adjacent web member, a gear mounted in concentric relation with respect to the shaft upon the other web member, gearing providing positive driving connection between the latter gear and the gear upon the shaft and means controlled by the speed of rotation of one of the web members for locking said web members together.

4. A speed controlling transmission comprising a fixed supporting member, a driving shaft journaled in the member and having a gear non-rotatably mounted thereon, a pair of web members rotatably disposed upon the shaft, one upon each side of the gear, a one way clutch having one element thereof rigidly secured to the supporting member and the other element secured to adjacent web member, a gear mounted in concentric relation with respect to the shaft upon the other web member, an internal-external gear providing positive driving connection between the latter gear and the gear upon the shaft and means controlled by rotation of the web member carrying the gear for locking said web members together.

5. A speed controlling transmission comprising a fixed supporting member, a driving shaft journaled in the member and having a gear non-rotatably mounted thereon, a pair of web members rotatably disposed upon the shaft, one upon each side of the gear, a one way clutch having one element secured to the adjacent web member, a gear mounted in concentric relation with respect to the shaft upon the other web member, gearing providing positive driving connection between the latter gear and the gear upon the shaft and means controlled by rotation of the web member carrying the gear for locking said web members together, said means operating by friction.

6. A speed controlling transmission comprising a fixed supporting member, a driving shaft journaled in the member and having a gear non-rotatably mounted thereon, a pair of web members rotatably disposed upon the shaft, one upon each side of the gear, a one way clutch having one element thereof rigidly secured to the supporting member and the other element secured to the adjacent web member, a gear mounted in concentric relation with respect to the shaft upon the other web member, gears providing a positive driving connection between the latter gear and the gear upon the shaft and friction clutch means actuated solely by the speed of the web members carrying the gear for locking the two web members together.

7. A speed controlling mechanism comprising a drive shaft, a driven shaft, a gear fixed upon the drive shaft, a pair of web members rotatably disposed upon the shaft, one upon each side of the gear, an internal gear fixed upon one of the web members in concentric relation with respect to the drive shaft, an internal-external gear interconnecting the two first mentioned gears, centrifugally actuated clutch means carried by the web members carrying the internal gear and engaging a clutch surface upon the other web member, the last mentioned web member having a carrier for the internal-external gear rigidly fixed to one side thereof, and having a one-way brake mechanism fixed upon the the opposite side thereof.

8. A speed controlling mechanism comprising a drive shaft having an external gear rigidly fixed thereon, a pair of web members rotatably disposed upon the shaft upon opposite sides of the gear, the web members being concave with the edges thereof in mating relation to enclose the gear, one of the web members carrying an internal gear meshing with an internal-external gear upon a carrier fixed to the other web member and also meshing with the first-mentioned gear, means for preventing reverse rotation of the last mentioned web member and friction clutch means for locking the two web members together for equal rotation, said friction clutch means being centrifugally controlled.

9. A speed controlling mechanism comprising a drive shaft and a driven shaft in coaxial alignment therewith, an internal gear journaled for rotation upon the drive shaft and having a sleeve rigid therewith and carrying an external gear concentrically fixed thereupon and meshing with gears driving the driven shaft, means including gearing providing a speed reducing drive between the drive shaft and the internal gear and means controlled solely by the speed of the driven shaft for varying the ratio of speed reduction effected by said speed reducing drive means.

In testimony whereof we affix our signatures.

HORACE T. THOMAS.
ALBERT B. HAYS.
JOHN BETHUNE.

CERTIFICATE OF CORRECTION.

Patent No. 1,885,156.　　　　　　　　　　　　　　　　November 1, 1932.

HORACE T. THOMAS ET AL.

It is hereby certified that the residence of the second mentioned patentee "John Bethune" should have been written and printed as "Rochester, New York", instead of "Lansing Michigan", and the residence of the third mentioned patentee "Albert B. Hays" should have been written and printed as "Lansing, Michigan", instead of "Rochester, New York"; and that the said Letters Patent should be read with these corrections therein that the same may conform to the record of the case in the Patent Office.

Signed and sealed this 3rd day of January, A. D. 1933.

M. J. Moore,
Acting Commissioner of Patents.

(Seal)